United States Patent
Miller

[11] Patent Number: 6,076,947
[45] Date of Patent: Jun. 20, 2000

[54] VISOR WITH ILLUMINATED VANITY ASSEMBLY

[75] Inventor: Douglas C. Miller, Hersey, Mich.

[73] Assignee: Lear Donnelly Overhead Systems, LLC, Novi, Mich.

[21] Appl. No.: 09/141,060

[22] Filed: Aug. 27, 1998

Related U.S. Application Data

[60] Provisional application No. 60/057,066, Aug. 29, 1997.

[51] Int. Cl.[7] .............................. B60Q 3/02; F21V 23/04; H01C 10/44
[52] U.S. Cl. .......................... 362/492; 362/295; 362/394; 338/183
[58] Field of Search ..................................... 362/135–137, 362/140–144, 295, 394, 492; 200/252, 260; 338/176, 179, 183, 200

[56] References Cited

U.S. PATENT DOCUMENTS

| | | | |
|---|---|---|---|
| 3,621,440 | 11/1971 | Eberwein | 338/183 |
| 3,671,915 | 6/1972 | Sasaki et al. | 338/176 |
| 4,000,404 | 12/1976 | Marcus | 362/135 |
| 4,060,789 | 11/1977 | Achtmann et al. | 338/176 |
| 4,075,468 | 2/1978 | Marcus | 362/144 |
| 4,227,241 | 10/1980 | Marcus | 362/492 |
| 4,491,899 | 1/1985 | Fleming | 362/492 |
| 4,494,789 | 1/1985 | Flowerday | 362/492 |
| 4,586,788 | 5/1986 | Hansen | 359/608 |
| 4,744,645 | 5/1988 | Sharp | 362/135 |
| 4,847,737 | 7/1989 | VanOrder et al. | 362/137 |
| 4,879,637 | 11/1989 | Clark et al. | 362/141 |
| 5,162,950 | 11/1992 | Suman et al. | 359/871 |
| 5,267,090 | 11/1993 | Dowd et al. | 359/838 |
| 5,278,736 | 1/1994 | Falcoff et al. | 362/141 |
| 5,329,430 | 7/1994 | Lanser et al. | 362/492 |
| 5,428,513 | 6/1995 | Hiemstra et al. | 362/143 |
| 5,473,573 | 12/1995 | White | 362/492 |

*Primary Examiner*—Alan Cariaso
*Attorney, Agent, or Firm*—Brooks & Kushman P.C.

[57] ABSTRACT

A visor with an illuminated vanity assembly comprising a base with a closable cover. A dimmer switch is provided on the base for controlling the light output of the illuminated vanity assembly. The dimmer switch comprises a slidable switch electrically coupling a light source contact and a resistor whereby the sliding of the switch relative to the resistor changes the resistance in the circuit to control the light output from the light source.

16 Claims, 3 Drawing Sheets

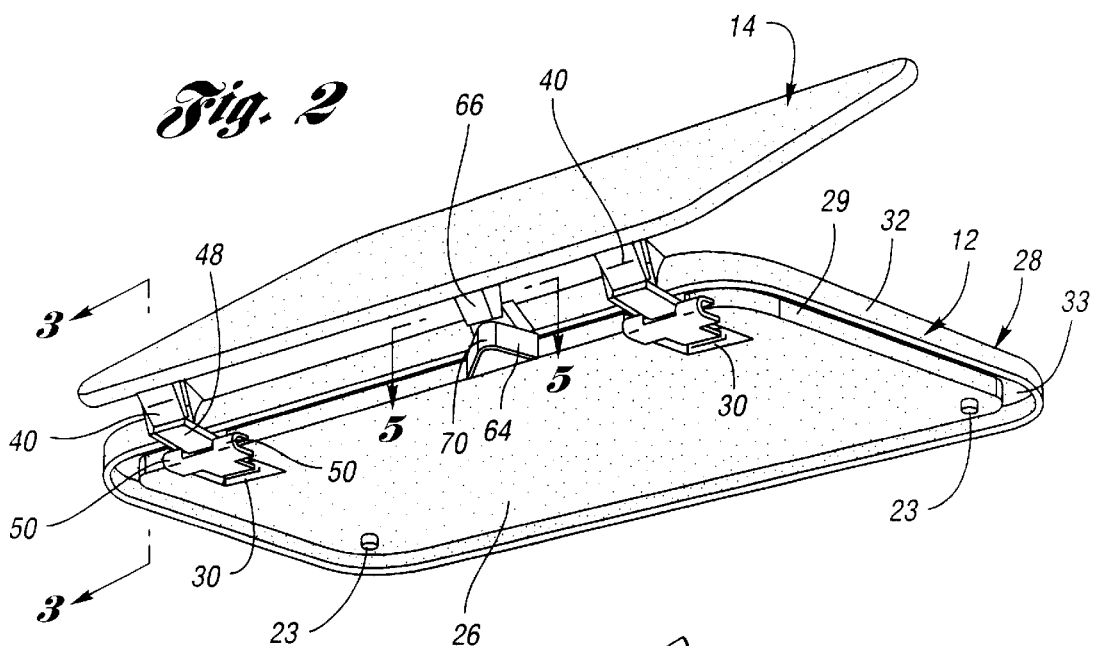
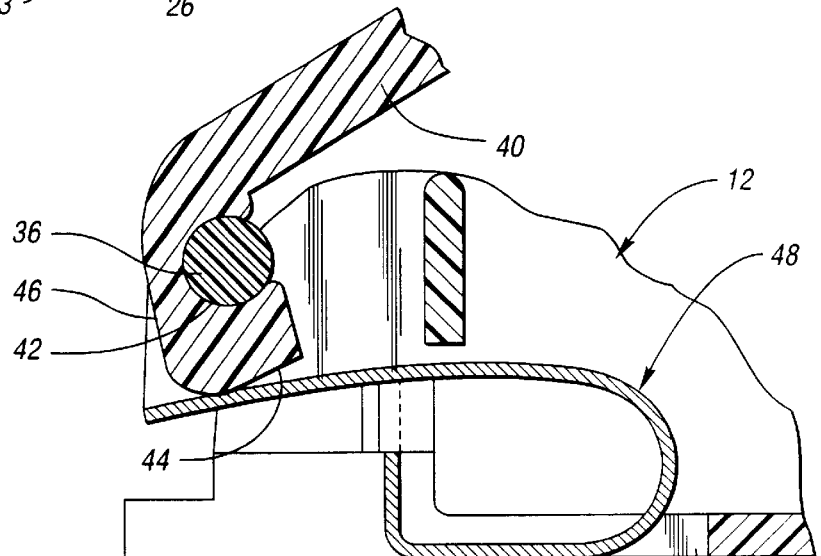
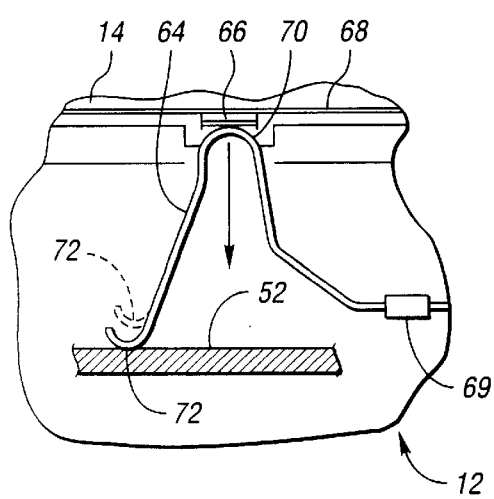

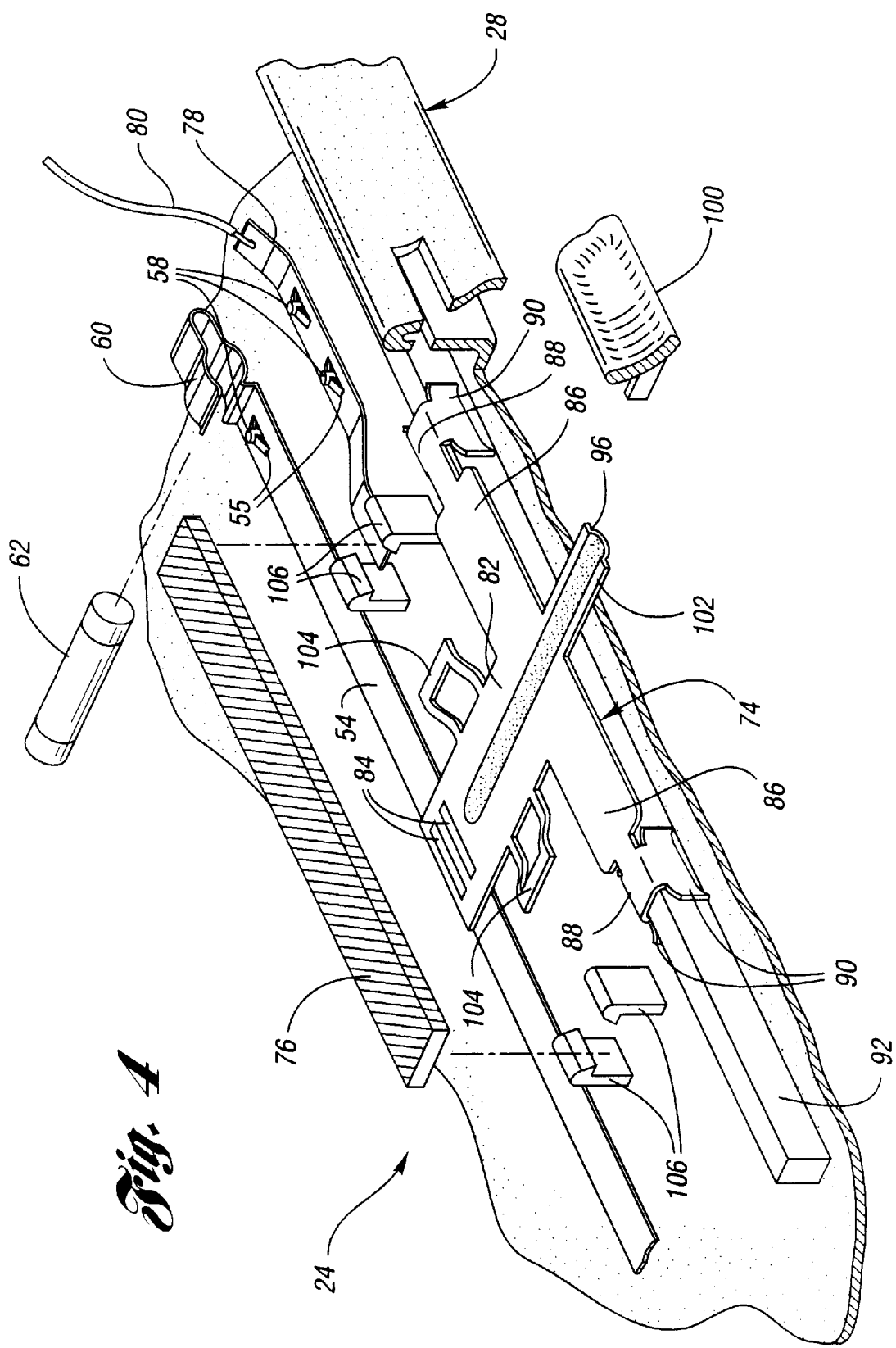

VISOR WITH ILLUMINATED VANITY ASSEMBLY

RELATED APPLICATION

This application claims the benefit of U.S. Provisional Application No. 60/057,066 filed Aug. 29, 1997.

BACKGROUND OF THE INVENTION

1. Field of the Invention

This invention relates to vehicle visors, and more particularly to an illuminated vanity assembly with brightness control.

2. Description of the Related Art

Vanity mirrors that mount to sun visors have long been a popular accessory in passenger vehicles. Typically, the mirror is mounted to or in an upper surface of the sun visor, so that when the sun visor is swung downwardly to a sun shading position, the mirror is aligned with the face of a user. Illuminated vanity mirrors have also been provided in sun visors for illuminating the face of a user in instances of low ambient light. One known type of illuminated vanity mirror includes a pair of electrical lamps disposed at opposite ends of the mirror and a cover that pivots between open and closed positions to alternately expose and cover the mirror and lights. Circuitry for electrically connecting the lamps to the vehicle's electrical system typically includes an on/off switch and a dimmer control that is manually adjustable by a user to control the brightness of the lamps.

SUMMARY OF THE INVENTION

According to the invention a vehicle visor having an illuminated vanity assembly with a light source adapted to be powered by a vehicle power supply. The visor comprises a first body portion on which is provided an elongated rail and an elongated electrical contact at an orientation substantially parallel to the rail. An elongated resistor, with first and second ends, is also provided on the first body portion, substantially parallel to the rail. The electrical contact is adapted to connect to a light source. A sliding switch has a contact portion that spans the electrical contact in the resistor and a guide portion engaging the rail to control the sliding movement of the switch. The electrical contact, resistor, and contact portion form part of an electrical circuit for supplying power to a light source and as the contact portion is slid from the first end of the resistor to the second end of the resistor in a path guided by the rail, the resistance in the electrical circuit is increased to decrease the voltage supplied to a light source to thereby dim the output of the light source.

Preferably, the visor comprises a vanity assembly having a base that is mounted to the visor body and the base mounts the rail and electrical contact. The sliding switch can further comprise a lever to be grasped by a user to slide the switch. The lever can terminate in a button for easier grasping of the switch.

The contact portion is preferably generally transverse to the relatively parallel orientation of the electrical contact in the resistor and further comprises two opposing fingers aligned with and in contact with the resistor. The resistor can be positioned such that it overlies the spring fingers, which then abut a bottom surface of the resistor to compress the switch contact portion against the electrical contact and a switch guide portion against the rail to mount the switch to the visor body. The switch guide portion can include opposing U-shaped portions connected by an elongated body overlying the rail, with the U-shaped portions having a width less than the width of the rail to provide a frictional fit between the U-shaped portions and the rail.

Preferably, the resistor comprises an insulating core with a resistance outer layer. The resistance outer layer can be a wire wrapped around the core or can be a resistance layer that is disposed on the surface in contact with the opposing fingers.

According to another embodiment of the invention an illuminated vanity assembly has a light source that is adapted to be powered by a vehicle power supply. The illuminated vanity assembly comprises a base having an elongated rail. An elongated electrical contact is provided on the base at an orientation that is substantially parallel to the rail. The electrical contact is adapted to connect to a light source. An elongated resistor, with first and second ends, is provided on the base also at an orientation that is substantially parallel to the rail. A sliding switch is provided that has a contact portion spanning the electrical contact and the resistor and a guide portion that engages the rail to control the sliding movement of the switch. The electrical contact, resistor, and switch contact portion form part of an electrical circuit that supplies power to a light source. As the contact portion of the switch is slid along the path guided by the rail from the first end of the resistor to the second end of the resistor, the resistance in the electrical circuit is increased to decrease the voltage supplied to a light source to thereby dim the output of the light source.

BRIEF DESCRIPTION OF THE DRAWINGS

The invention will now be described with reference to the drawings in which:

FIG. 2 is a rear perspective view of the vanity mirror assembly of FIG. 1;

FIG. 3 is a cross sectional view of a spring detent mechanism taken along line 3—3 of FIG. 2;

FIG. 4 is an enlarged partially exploded view of the dimmer switch of FIG. 1; and FIG. 5 is an enlarged top view of a contact switch taken along line 5—5 of FIG. 2.

DETAILED DESCRIPTION OF THE PREFERRED EMBODIMENTS

Figure 1:
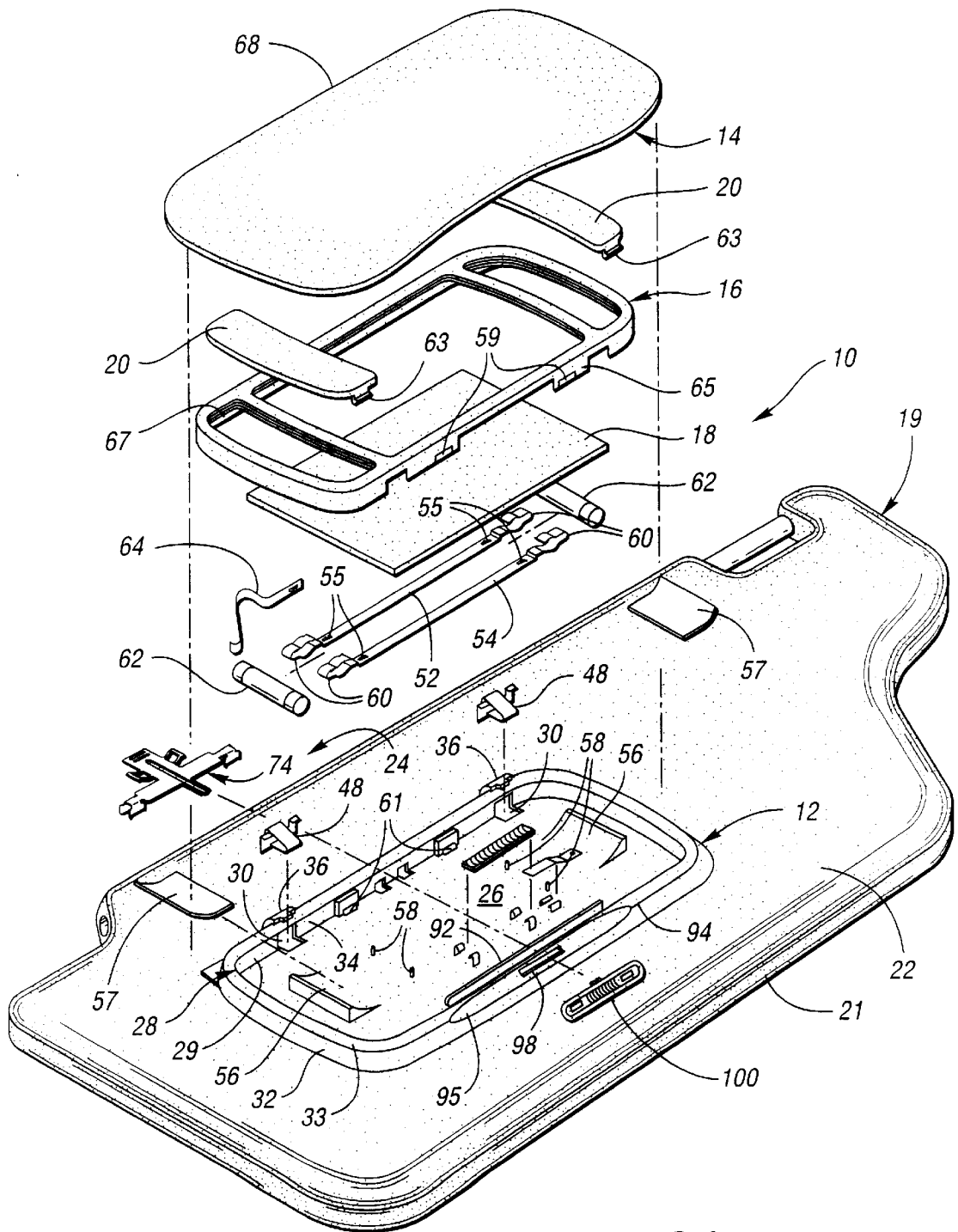
FIG. 1 is an exploded view of a vanity mirror assembly incorporating a dimmer switch according to the invention.

Referring now to FIGS. 1–3, a vanity mirror assembly 10 for a sun visor or the like comprises a base 12, a lid 14 adapted for pivotal attachment to the base 12, a mirror frame 16 for holding a mirror 18 and a pair of spaced lenses 20, and a lamp illumination and dimmer assembly 24 for attachment to the base 12.

The base 12 includes a floor 26 and mounting bosses 23 projecting downwardly therefrom for installation in a sun visor 19 or other vehicle accessory (not shown). The sun visor comprises first and second halves 21, 22, which are connected together. An upstanding wall 28 includes a first inner wall section 29 that is integrally molded with and extends around the outer periphery of the floor 26 and a second outer wall section 32 that is parallel with the inner wall section 29 and is connected thereto through an integrally molded bight portion 33. A pair of spaced openings 30 extend through the floor 26 and a rear portion 34 of both wall sections 29 and 32. A pivot pin 36 is located above each opening 30 and is integrally formed with the bight portion 33 of the wall 28. A corresponding pair of spaced pivot arms 40 are formed integral with a rearward portion 68 of the lid 14. Each of the pivot arms include a C-shaped socket 42 that snap-fits over the pivot pins 36, thereby mounting the lid 14 for rotation with respect to the base 12. A pair of cam surfaces 44 and 46 are formed on each pivot arm 40 and ride against a leaf spring 48 positioned within each opening 30. The cam surfaces 44 and 46 serve as detents for maintaining the lid in a closed and open position, respectively, with respect to the base 12. Each leaf spring 48 is U-shaped in side elevation and includes a pair of laterally spaced retainers 50 that extend into slots 51 on either side of the opening 30.

A pair of ramps 56 are formed integrally with the base 12 and curve outwardly and upwardly from the floor 26. Reflective tape 57 or other reflective coating is applied to an upper surface of each ramp, such that light from a pair of spaced elongate filament-type light bulbs 62 is reflected toward the corresponding lens 20.

The mirror frame 16 includes tabs 59 at the front and rear portions 65, 67 thereof (only the front tabs are shown) that snap-fit into corresponding apertures 61 in the wall 28 during installation of the mirror frame to the base 12, without the use of tools or other fasteners. Likewise, each lens 20 includes a pair of tabs 63 at opposite ends thereof (only one tab is shown) that snap-fit into corresponding apertures (not shown) in the mirror frame 16.

With reference now to FIGS. 1, 4 and 5, the lamp illumination and dimmer assembly 24 includes a pair of spaced apart conductive strips 52 and 54 that are attached to the floor 26 by aligning a pair of spaced apart H-shaped slots 55 in the conductive strips with a pair of corresponding pins 58 extending from the floor 26 and then pressing the slots over the pins until the strips contact the floor. The shape of the slots 55 lock the strips to the pins without further fastening. A socket 60 is integrally formed at each end of the conductive strips 52 and 54 for receiving one end of an elongate filament-type light bulb 62 in a snap-fit engagement. A U-shaped electrical contact 64 is fixedly attached at one end thereof to a boss 69 (shown in FIG. 5) extending from the floor 26. The contact 64 is connected to the positive terminal of a battery or generator (not shown).

As illustrated in FIGS. 2 and 5, a tab 66 is integrally formed on the rearward portion 68 of the lid 14 and contacts an apex 70 of the electrical contact 64 as the lid is opened. Movement of the lid toward the open position causes rotation of the tab toward the base 12 to thereby force a free end 72 of the electrical contact 64 into sliding engagement with the conductive strip 52. The free end 72 of the electrical contact 64 is curved to permit smooth engagement and sliding action with the strip 52. In its "home" or "off" position, the free end 72 of the contact is spaced a short distance from the strip 52 due to its shape and intrinsic resiliency. Thus, when the lid is in the fully closed position, the tab 66 is spaced slightly away from the apex 70 of the electrical contact 64, as shown in dashed line in FIG. 5, thereby releasing the contact from contact with the conductive strip 52 to return to its home position.

Referring again to FIGS. 1 and 4, the lamp illumination and dimmer assembly 24 further includes an electrical sliding switch 74 that slides along the conductive strip 54, a resistor bar 76 in contact with the sliding switch 74, and a conductive strip 78 that is connected to ground via an electrical wire 80. The sliding switch 74 includes an elongate base portion 82 having a pair of contacts 84 at one end thereof that extend downwardly to contact and slide along the conductive strip 54. A pair of arms 86 are formed at an opposite end of the base portion 82 and extend substantially perpendicular to the longitudinal extension of the base portion 82. A free end of each arm 86 includes a tab 88 having downwardly depending guide flanges 90 that engage a rail 92 projecting upwardly from the floor 26. The rail 92 is preferably formed as an integral part of the base 12 and is adjacent to and substantially parallel with a front portion 94 of the wall 28. The guide flanges 90 are curved slightly outwardly from their centers for smooth movement along the rail 92. The distance between centers of opposing guide flanges on each tab 88 is slightly less than the width of the rail for providing slight frictional resistance during movement of the sliding switch 74. A shank 96 extends outwardly from the base portion 82 and through an elongate slot 98 in the front wall portion 94. A slide button 100 is attached to the end of the shank 96 outside of the wall portion 28 for grasping and manipulating the sliding switch by a user. The wall front portion 94 can include a chamfered or recessed area 95 that extends at least along the length of the slot 98 to minimize the length of the shank 96, and thus the amount that the button 100 protrudes outwardly from the base 12. An elongate groove 102 is formed in the base portion and shank in order to impart structural rigidity thereto. A pair of contact fingers 104 extend in the same general direction as the arms 86 and curve upwardly from the base portion 82 to contact the resistor bar 76. The sliding switch 74 is preferably stamped and formed from a single conductive metallic sheet that exhibits some resiliency in order to impart a biasing force against the resistor bar 76, the rail 92, and the conductive strip 54.

The resistor bar 76 is preferably constructed of a non-conductive ceramic core wrapped with a resistance wire or coated on one side with a resistive coating, such as carbon or micarta. Alternatively, a metallic support bar constructed of aluminum or steel can have a layer of electrically-insulating material on a lower surface thereof, followed by a layer of resistive material, such as carbon. Pairs of opposing snap tabs 106 project upwardly from the floor 26 for receiving and holding the resistor bar 76 against movement with respect to the base 12. The conductive strip 78, as with the conductive strips 52 and 54, includes H-shaped slots 55 that lock around pins 58 when installed thereon to hold the conductive strip on the floor 26. When installed, the conductive strip 78 is received between one of the pairs of snap tabs 106 and contacts a lower end portion of the resistor bar 76.

In use, the lid 14 of the vanity mirror assembly 10 is raised to expose the mirror 18 and lenses 20. In so doing, the tab 66 on the lid rearward portion 68 presses against the apex 70 of the electrical contact 64 and forces the free end 72 of the electrical contact 64 into engagement with the conductive strip 52. The conductive strip 54 is electrically connected to the conductive strip 52 only through the light bulbs 62. If both light bulbs are missing or their filaments are broken, current flow through the circuit is interrupted. If, however, there is at least one light bulb 62 installed between the conductive strips 52 and 54 with its filament intact, electrical current flows therethrough to thereby illuminate the bulb(s). The sliding contact switch 74 is in electrical communication with the conductive strip 54 and the resistor bar 76 throughout its entire range of sliding movement to constantly conduct the electrical current through the resistive layer on the resistor bar 76 and then to ground to complete the electrical circuit. The intensity of the light from the bulb(s) 62 can be varied by varying the position of the switch 74 with respect to the resistor bar 76. If, for example the switch 74 is moved to the left, as viewed in FIGS. 1 and 4, the light grows dimmer due to the increase in resistance between the right contact finger 104 and the conductive strip 78. Likewise, the light grows brighter as the switch 74 is moved to the right due to the decrease in resistance between the right contact finger 104 and the conductive strip 78. When the lid is closed, the electrical contact 64 disengages the conductive strip 52 to thereby break the flow of electricity through the circuit and turn the bulbs off, no matter what position the sliding switch 74 is in.

While particular embodiments of the invention have been described, it will be understood that the invention is not limited thereto since modification may be made by those skilled in the art, particularly in light of the foregoing teachings. For example, although the rail and other support elements for the dimmer switch are shown formed in the base of the vanity assembly, it is possible for the base to be eliminated and the structural elements be provided on one or the visor halves, preferably the rear visor half.

What is claimed is:

1. A vehicle visor having an illuminated vanity assembly with a light source adapted to be powered by a vehicle power supply, the visor comprising:
   a first body portion having an elongated rail;
   an elongated electrical contact provided on the first body portion at an orientation substantially parallel to the rail and adapted to connect to a light source;
   an elongated resistor having a first end and a second end and provided on the first body portion at an orientation substantially parallel to the rail;
   a sliding switch having a contact portion spanning the electrical contact and the resistor and a guide portion engaging the rail to control the sliding movement of the switch;
   wherein the electrical contact, resistor, and contact portion form part of an electrical circuit for supplying power to a light source and as the contact portion is slid from the first end of the resistor to the second end of the resistor in a path guided by the rail, the resistance in the electrical circuit is increased to decrease the voltage supplied to a light source to thereby dim the output of the light source;
   wherein the sliding switch further comprises a lever to be grasped by a user to slide the switch, and the lever extends above the exterior of the visor and terminates in a button; and
   wherein the contact portion is generally transverse to the relatively parallel orientation of the electrical contact and the resistor and further comprises two opposing spring fingers aligned with and contacting the resistor.

2. A vehicle visor according to claim 1 and further comprising a vanity assembly base in which is formed the rail and on which is mounted the electrical contact and resistor.

3. An illuminated vanity assembly according to claim 1 wherein the resistor is positioned such that the resistor overlies the spring fingers, which abut a bottom surface of the resistor, to compress the switch contact portion against the electrical contact and the switch guide portion against the rail to mount the switch to the first body portion.

4. An illuminated vanity assembly according to claim 3 wherein the switch guide portion has at least one U-shaped cross section portion in which the rail is received.

5. An illuminated vanity assembly according to claim 4 wherein the switch guide portion has opposing U-shaped portions connected by an elongated body overlying the rail and the width of the U-shaped portions are less than the width of the rail to provide a frictional fit between the U-shaped portions and the rail.

6. An illuminated vanity assembly according to claim 3 wherein contact fingers extend from contact portion and abut the electrical contact.

7. An illuminated vanity assembly according to claim 3 wherein the electrical contact further comprises a bulb clip adapted to receive and hold one end of a light source.

8. An illuminated vanity assembly according to claim 3 wherein the resistor comprises an insulating core with a resistance outer layer.

9. An illuminated vanity assembly according to claim 8 wherein the resistance outer layer is a wire wrapped around the core.

10. An illuminated vanity assembly according to claim 8 wherein the resistance outer layer is disposed on the surface in contact with the opposing fingers.

11. An illuminated vanity assembly according to claim 1 and further comprising a second elongated electrical contact adapted to supply electrical power from a vehicle power source to a light source and the resistor is adapted to connect to a vehicle ground.

12. An illuminated vanity assembly according to claim 1 wherein the resistance is continuously varied as the switch is slid along the resistor.

13. An illuminated vanity assembly for a vehicle visor and having a light source adapted to be powered by a vehicle power supply, comprising:
   a base having an elongated rail;
   an elongated electrical contact provided on the base at an orientation substantially parallel to the rail and adapted to connect to a light source;
   an elongated resistor having a first end and a second end and provided on the base at an orientation substantially parallel to the rail;
   a sliding switch having a contact portion spanning the electrical contact and the resistor and a guide portion engaging the rail to control the sliding movement of the switch;
   wherein the electrical contact, resistor, and contact portion form part of an electrical circuit for supplying power to a light source and as the contact portion is slid from the first end of the resistor to the second end of the resistor in a path guided by the rail, the resistance in the electrical circuit is increased to decrease the voltage supplied to a light source to thereby dim the output of the light source; and
   wherein the contact portion is generally transverse to the relatively parallel orientation of the electrical contact and the resistor and further comprises two opposing spring fingers aligned with and contacting the resistor.

14. An illuminated vanity assembly according to claim 13 wherein the resistor is mounted to the base such that the resistor overlies the spring fingers, which abut a bottom surface of the resistor, to compress the switch contact portion against the electrical contact and the switch guide portion against the rail to mount the switch to the first body portion.

15. An illuminated vanity assembly according to claim 14 wherein the resistor comprises an insulating core with a resistance outer layer.

16. An illuminated vanity assembly according to claim 15 wherein the resistance outer layer is a wire wrapped around the core.

* * * * *